Figure 3:
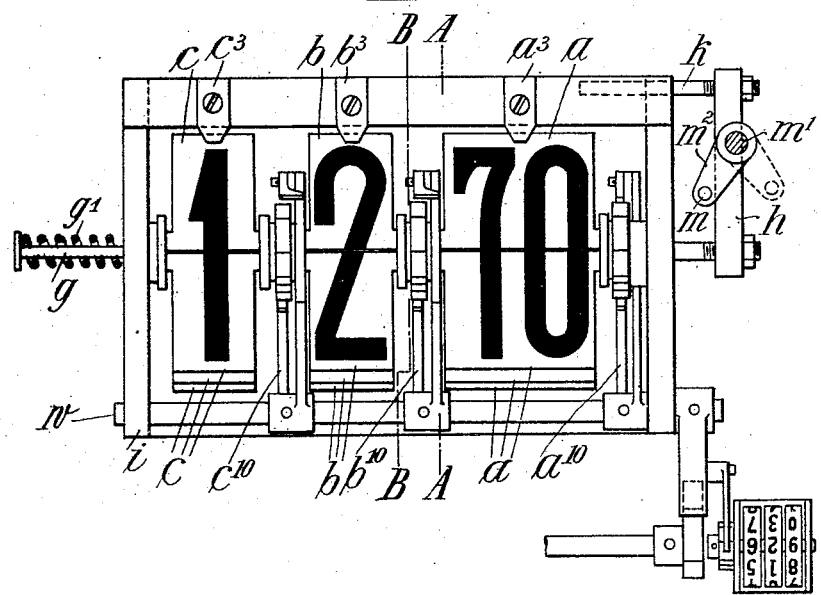

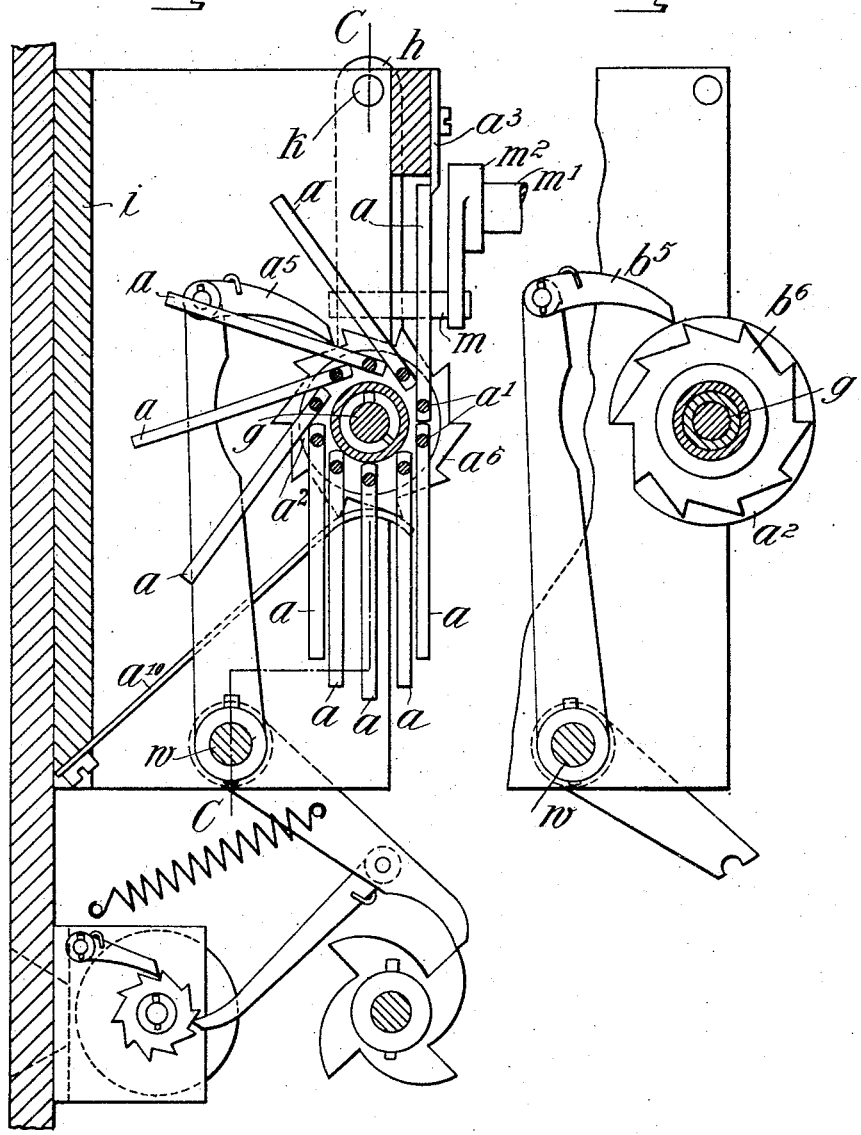

P. RICHERT.
RESETTING MECHANISM FOR INDICATING APPARATUS.
APPLICATION FILED APR. 27, 1908.

916,371.

Patented Mar. 23, 1909.

WITNESSES:
G. V. Rasmussen
John A. Fehlenbeck

INVENTOR
Paul Richert
BY
Briesen & Knauth
ATTORNEYS

UNITED STATES PATENT OFFICE.

PAUL RICHERT, OF BERLIN, GERMANY.

RESETTING MECHANISM FOR INDICATING APPARATUS.

No. 916,371. Specification of Letters Patent. Patented March 23, 1909.

Original application filed May 22, 1907, Serial No. 375,021. Divided and this application filed April 27, 1908. Serial No. 429,334.

*To all whom it may concern:*

Be it known that I, PAUL RICHERT, a citizen of the German Empire, residing at Berlin, in the Kingdom of Prussia, German Empire, have invented new and useful Improvements in Resetting Mechanism for Indicating Apparatus, of which the following is a specification.

This application is a division of an application filed by me on May 22, 1907, No. 375,021, and Patent No. 901,558, October 20, 1908, to which application and patent reference may be had for a full description of the parts shown but not claimed herein.

My invention relates to improvements in resetting-mechanism for indicating-apparatus of that class which comprises the subject matter of my prior application before referred to, in which the successive alterations instead of being effected by hand, are effected automatically—from a zero or initial position—after certain occurrences (for instance in the case of fare-indicators, after a quarter of or half a mile has been covered). Such indicators have usually to be reset periodically (in the case of fare-indicators, for example, on termination of a journey). In many such indicators it is requisite that the resetting should be effected automatically, that is to say, the indicating-mechanism reset with positive motion on the operation of some part (for instance on the so-called "flag" of a fare-indicator being raised for the purpose of bringing the apparatus out of action).

My invention consists of a device by means of which the automatic resetting of an automatic indicating-apparatus is effected by rotation solely in the same direction in which the feed of the indicating-apparatus takes place.

Automatic apparatus which do not effect resetting exclusively by rotation in the same direction of the feed, for the reason that the feed pawl and check must be lifted from the wheels during resetting, cannot be employed for indicating-apparatuses in which backward direction cannot take place for constructional reasons, for instance in those indicators in which the indication is effected by means of pivoted plates temporarily retained by a finger prior to dropping forward. My new resetting-mechanism, on the other hand, can be employed in indicators in which backward rotation is not permissible, neither the feed-pawl nor the check having to be lifted from the ratchet wheel during resetting.

One form of my new resetting-mechanism is illustrated in the accompanying drawings in combination with the indicating mechanism of a fare-indicator.

Figure 4:
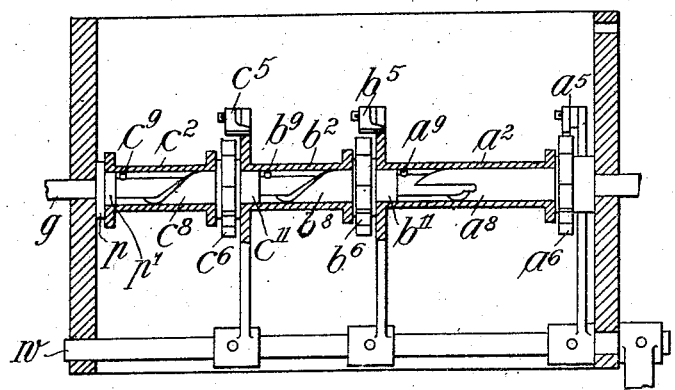

In the drawings Figure 1 is a section on the line A—A of Fig. 3; Fig. 2 is a section on the line B—B of Fig. 3; Fig. 3 is a front elevation of Fig. 1 on a smaller scale; Fig. 4 is a section on the line C—C of Fig. 1 on the same scale as Fig. 3.

The indicating-apparatus, to which the invention is applied, consists of three counters, the first of which may be arranged to indicate either 0, 10, 20 . . . 90 cents. The second counter may be arranged to indicate amounts of 0, 1, 2 . . . 9 dollars, while the third counter may indicate amounts of 10, 20 . . . 90 dollars.

The numbers to be indicated by each counter are marked on the fronts and backs of plates $a$, $b$, $c$ which are pivoted by means of pins $a^1$, $b^1$, $c^1$, in the end flanges of rollers $a^2$, $b^2$, $c^2$ in such a manner that each two successive plates together exhibit a complete number, in well-known manner. The rollers are mounted side by side on a common axle, and are moved forward, by means of devices of familiar construction each time through a distance such as will bring each number-plate in the place of the one immediately preceding, the top plate each time being retained by a finger $a^3$, $b^3$, $c^3$.

The three counters are operated from a common shaft $w$ by means of pawls $a^5$, $b^5$, $c^5$ engaging with ratchet wheels $a^6$, $b^6$, $c^6$ fixed to the rollers $a^2$, $b^2$, $c^2$ respectively. The pawls $b^5$, $c^5$ are normally prevented from engaging with the ratchet wheel $b^6$, in the manner described in my prior application before referred to. After each operation each of the three counters must be returned automatically and simultaneously into its zero position, or into its initial position. For this purpose I mount the three rollers $a^2$, $b^2$, $c^2$ of the three counters side by side on a shaft $g$ (Fig. 4) which is capable of axial but not of rotary motion; whereas the rollers themselves can rotate, but cannot move axially. To each roller there is connected a complete thread of a quick-pitched screw $a^8$, $b^8$, $c^8$, respectively. During the operative position of the apparatus, studs $a^9$, $b^9$, $c^9$, fixed on the slidable but not rotatable shaft $g$, are shifted so far to the left as to keep them out of engagement with the screw threads.

In resetting the counters to zero, the shaft $g$ is shifted to the right so as to bring the studs $a^9$, $b^9$, $c^9$, into engagement with the screw-threads $a^8$, $b^8$, $c^8$, respectively, whereupon the latter are rotated, together with their rollers $a^2$, $b^2$, $c^2$, until each stud has reached the lowest point of its corresponding screw-thread. The rotary motion has the same direction as that of the advance of the several counters. Therefore by shifting the shaft $g$ into its extreme right hand position, each of the rollers $a^2$, $b^2$, $c^2$ will be rotated in a forward direction to a determined position in which the counters will indicate zero.

In the example shown, the shaft $g$ is prevented from rotating by means of a bar $h$ (Fig. 3) which is fixed thereto, and is guided in the frame $i$ of the counter by means of a rod $k$ fixed to the bar $h$. A spring $g^1$ imparts to the shaft $g$ a constant tendency to return into its extreme left position, which corresponds with the operative position of the fare-indicator. To bring the fare-indicator into its inoperative position, a shaft $m^1$ is rotated so as to press the pin $m$ of its crank $m^2$, against the bar $h$, whereby the shaft $g$ is moved into its extreme right hand position. By this movement all three counters are advanced into the zero or initial position. Since this setting to zero takes place in the same direction of rotation as that in which the ratchet wheels $a^6$, $b^6$, $c^6$ are advanced by the driving pawls $a^5$, $b^5$, $c^5$ it is not necessary to place these pawls out of engagement with their ratchet wheels as is the case each time in the devices for setting the counters back to zero employed hitherto. Nor is it necessary to place the retaining-catches, or in their stead the springs $a^{10}$, $b^{10}$, $c^{10}$ employed in the example shown to engage with the ratchet wheels $a^6$, $b^6$, $c^6$, out of engagement with said ratchet wheels, so that this feature constitutes a further simplification in the construction and operation of zero setting mechanisms.

Having thus described my invention, what I claim as new and desire to secure by Letters Patent is:—

1. In automatic indicating-apparatus, in combination, means for exhibiting characters, a rotating member carrying said means and presenting a spiral surface whose thread faces solely in the same direction in which the rotating member is fed and means adapted to bear against said spiral surface to rotate said rotating member only in the direction of feed.

2. In automatic indicating-apparatus, in combination, an axially sliding non-rotary shaft, means for exhibiting characters, a roller rotating on said shaft and carrying said means, a sleeve loosely mounted on said shaft and rigidly connected to said roller, and a stud on the non-rotary shaft adapted, when said shaft is moved longitudinally, to engage said sleeve and rotate it and its roller solely in the direction of feed of the indicating devices, substantially as described.

3. In automatic indicating-apparatus, in combination, an axially sliding non-rotary shaft, means for exhibiting characters, a plurality of rollers rotating on said shaft and carrying said means, a plurality of sleeves loosely mounted on said shaft and rigidly connected to said rollers, and studs on each non-rotary shaft adapted, when said shafts are moved longitudinally, to engage said sleeves and rotate them and their rollers solely in the direction of feed of the indicating devices, substantially as described.

In witness whereof I have hereunto set my hand in presence of two witnesses.

PAUL RICHERT.

Witnesses:
 HENRY HASPER,
 WOLDEMAR HAUPT.